US012692730B2

(12) United States Patent
Araki et al.

(10) Patent No.: US 12,692,730 B2
(45) Date of Patent: Jul. 28, 2026

(54) VEHICLE REAR GATE PANEL

(71) Applicant: SUBARU CORPORATION, Tokyo (JP)

(72) Inventors: Kenichi Araki, Tokyo (JP); Akihisa Nomura, Tokyo (JP); Yuhei Suda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 374 days.

(21) Appl. No.: 18/383,230

(22) Filed: Oct. 24, 2023

(65) Prior Publication Data

US 2024/0149648 A1 May 9, 2024

(30) Foreign Application Priority Data

Nov. 4, 2022 (JP) .................................. 2022-177640

(51) Int. Cl.
*E05B 79/06* (2014.01)
*B60J 5/10* (2006.01)
(52) U.S. Cl.
CPC ............... *E05B 79/06* (2013.01); *B60J 5/107* (2013.01)
(58) Field of Classification Search
CPC . B60J 5/101; B60J 5/107; E05B 83/18; E05B 79/06
See application file for complete search history.

(56) References Cited

U.S. PATENT DOCUMENTS

2015/0329066 A1* 11/2015 Barrow .................... B60J 5/107
296/146.8

FOREIGN PATENT DOCUMENTS

JP    2015-30390 A    2/2015
JP    2016097880 A  *  5/2016

* cited by examiner

*Primary Examiner* — Dany E Akakpo
(74) *Attorney, Agent, or Firm* — TROUTMAN PEPPER LOCKE LLP

(57) ABSTRACT

A vehicle rear gate panel includes a vehicle body panel that constitutes a rear gate panel, a first ratchet opening that is provided in the vehicle body panel and through which a ratchet mechanism is inserted, a first handle opening that is provided in the vehicle body panel at a position aligned with the first ratchet opening in a vehicle width direction and through which a pull handle is inserted, and a bracket that integrally reinforces regions where the first ratchet opening and the first handle opening are provided. The bracket has a second ratchet opening at a position corresponding to the first ratchet opening and through which the ratchet mechanism is inserted, a second handle opening at a position corresponding to the first handle opening and through which the pull handle is inserted, and beads on respective sides of the second ratchet opening.

7 Claims, 4 Drawing Sheets

FIG. 2

VEHICLE REAR GATE PANEL

CROSS-REFERENCE TO RELATED APPLICATION

The present application claims priority from Japanese Patent Application No. 2022-177640 filed on Nov. 4, 2022, the entire contents of which are hereby incorporated by reference.

BACKGROUND

The disclosure relates to a vehicle rear gate panel configured to open and close a rear gate opening provided in a rear part of a vehicle body.

In related art, a rear gate panel for opening and closing a rear gate opening is provided at a rear part of a hatchback or wagon vehicle body. An upper end (fixed end) of the rear gate panel is swingably coupled to an upper edge of the rear gate opening via a hinge or the like. A ratchet mechanism is provided on a lower end (free end) of the rear gate panel. The ratchet mechanism is configured to be engageable with a striker disposed on a lower edge of the rear gate opening.

In general, the ratchet mechanism is attached to an inner panel that constitutes the rear gate panel. Therefore, the inner panel is provided with reinforcement for reinforcing an attachment portion (latch attachment portion) for the ratchet mechanism. As such a reinforcement, for example, Japanese Unexamined Patent Application Publication (JP-A) No. 2015-30390 discloses a reinforcement (latch reinforcement) configured to integrally reinforce attachment portions for a latch unit and an open switch in an inner panel.

SUMMARY

An aspect of the present disclosure provides a vehicle rear gate panel including a vehicle body panel, a first ratchet opening, a first handle opening, and a bracket. The vehicle body panel constitutes a rear gate panel. The first ratchet opening is provided in the vehicle body panel, and a ratchet mechanism is inserted through the first rachet opening. The first handle opening is provided in the vehicle body panel at a position aligned with the first ratchet opening in a vehicle width direction, and a pull handle is inserted through the first handle opening. The bracket integrally reinforces a region where the first ratchet opening is provided and a region where the first handle opening is provided in the inner panel. The bracket has a second ratchet opening, a second handle opening, and beads. The second ratchet opening is provided at a position corresponding to the first ratchet opening, and the ratchet mechanism is inserted through the second ratchet opening. The second handle opening is provided at a position corresponding to the first handle opening, and the pull handle is inserted through the second handle opening. The beads are provided on respective sides of the second ratchet opening in the vehicle width direction.

BRIEF DESCRIPTION OF THE DRAWINGS

FIG. 2 is a plan view illustrating an inner panel of a rear gate panel as viewed from behind.

DETAILED DESCRIPTION

In recent years, a rear gate glass inclination angle tends to be set large in a vehicle in order to reduce aerodynamical drag and improve fuel economy. In general, when an attempt is made to secure a rear field of vision while setting a large rear gate glass inclination angle, a rear gate panel is increased in size. When a weight of the rear gate panel is increased due to such a size increase of the rear gate panel, it is important to effectively reinforce a latch attachment portion by a reinforcement.

Meanwhile, on such a rear gate panel, a pull handle for a user or the like to manually open and close the rear gate panel may be provided in the vicinity of a ratchet mechanism of an inner panel. In such a case, strength of the inner panel around the ratchet mechanism may be decreased due to an opening formed in the inner panel for attaching the pull handle.

It is desirable to provide a vehicle rear gate panel that can efficiently reinforce attachment portions for a ratchet mechanism and a pull handle with a simple configuration.

Figure 1:
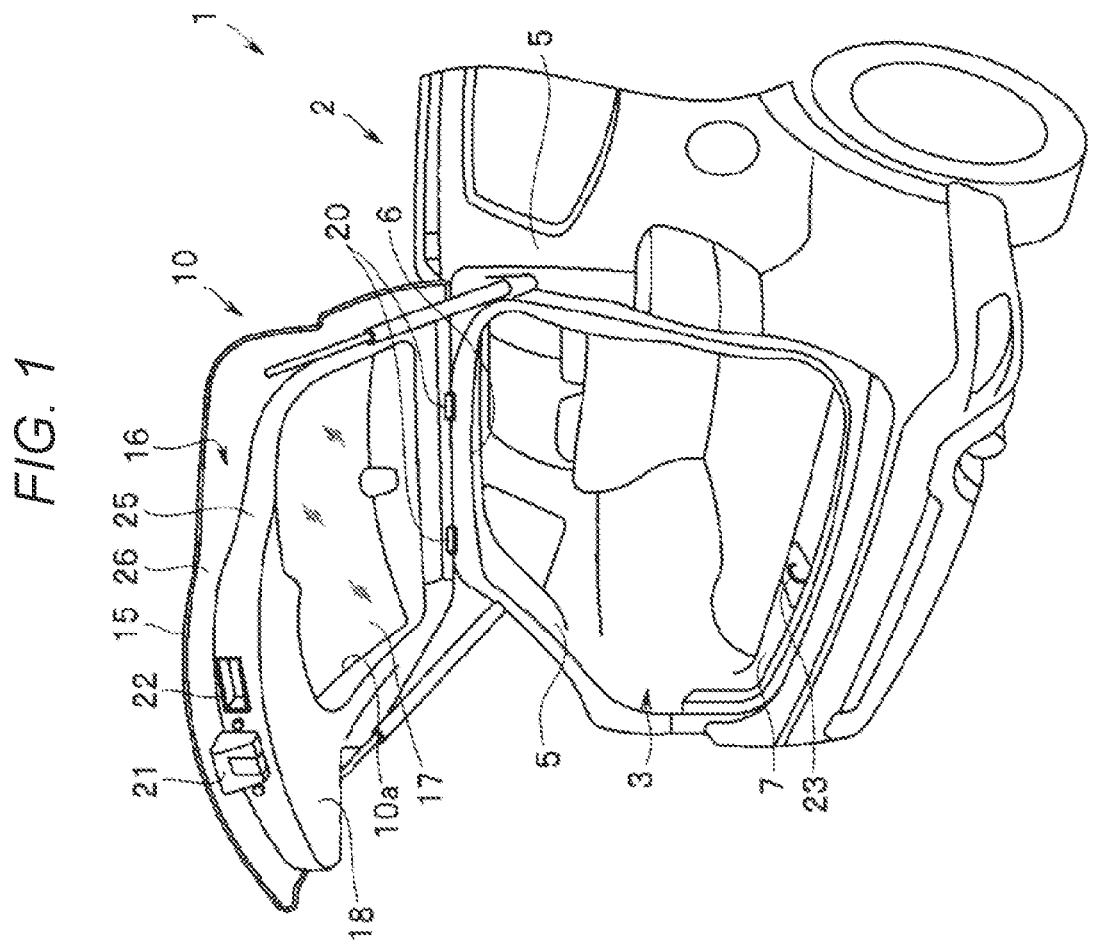
FIG. 1 is a perspective view illustrating a rear part of a vehicle body.

Hereinafter, an embodiment of the disclosure will be described with reference to the drawings. FIG. 1 is a perspective view illustrating a rear part of a vehicle body according to an embodiment of the disclosure.

A vehicle 1 illustrated in FIG. 1 is, for example, a wagon vehicle. A rear gate opening 3 is provided in a rear end of a vehicle body 2 of the vehicle 1. The rear gate opening 3 is surrounded by, for example, rear pillars 5 disposed on left and right sides of the rear end of the vehicle body 2, a rear roof rail 6 and a rear frame 7 disposed on upper and lower sides of the rear end of the vehicle body 2.

A rear gate panel 10 configured to open and close the rear gate opening 3 is further provided at a rear part of the vehicle body 2. The rear gate panel 10 includes an outer panel 15 and an inner panel 16 as vehicle body panels.

As illustrated in FIG. 1, an edge of the outer panel 15 is folded back toward the inner panel 16. Accordingly, the outer panel 15 and the inner panel 16 are hemmed together.

A window opening 10a is provided in the vicinity of an upper part of the rear gate panel 10. The window opening 10a is closed by a rear gate glass 17.

A rear gate trim 18 for decorating the interior of a vehicle cabin is attached to a front surface (inner panel 16) of the rear gate panel 10.

An upper end (fixed end) of the rear gate panel 10 configured as described above is coupled to the rear roof rail 6 via a pair of left and right hinges 20. Accordingly, the rear gate panel 10 is attached to the vehicle body 2 in a state of being swingable with respect to the vehicle body 2. By such swinging, the rear gate panel 10 can open and close the rear gate opening 3.

A ratchet mechanism 21 and a pull handle 22 are further provided on a lower end (free end) of the rear gate panel 10.

The ratchet mechanism 21 is provided on a bottom of the rear gate panel 10 at a substantial center in a vehicle width direction. The ratchet mechanism 21 is engageable with a striker 23 provided on the rear frame 7. That is, the ratchet mechanism 21 is engaged with the striker 23 when the rear gate panel 10 swings to reach a position where the rear gate opening 3 is closed. By this engagement, the ratchet mechanism 21 can maintain a state in which the rear gate opening 3 is closed by the rear gate panel 10.

The pull handle 22 is provided in the vicinity of the ratchet mechanism 21. For example, the pull handle 22 is disposed on the bottom of the rear gate panel 10 at a position aligned with the ratchet mechanism 21 in the vehicle width direction.

The pull handle 22 is, for example, an embedded handle inserted into the rear gate panel 10 from the bottom of the rear gate panel 10. In the embodiment, the pull handle 22 has a substantial box shape opened on the bottom of the rear gate panel 10. The user or the like can swing the rear gate panel 10 with fingers hooked into an opening of the pull handle 22. Accordingly, the user or the like can open and close the rear gate opening 3.

The ratchet mechanism 21 and the pull handle 22 are attached to the inner panel 16 of the rear gate panel 10.

Figure 2:
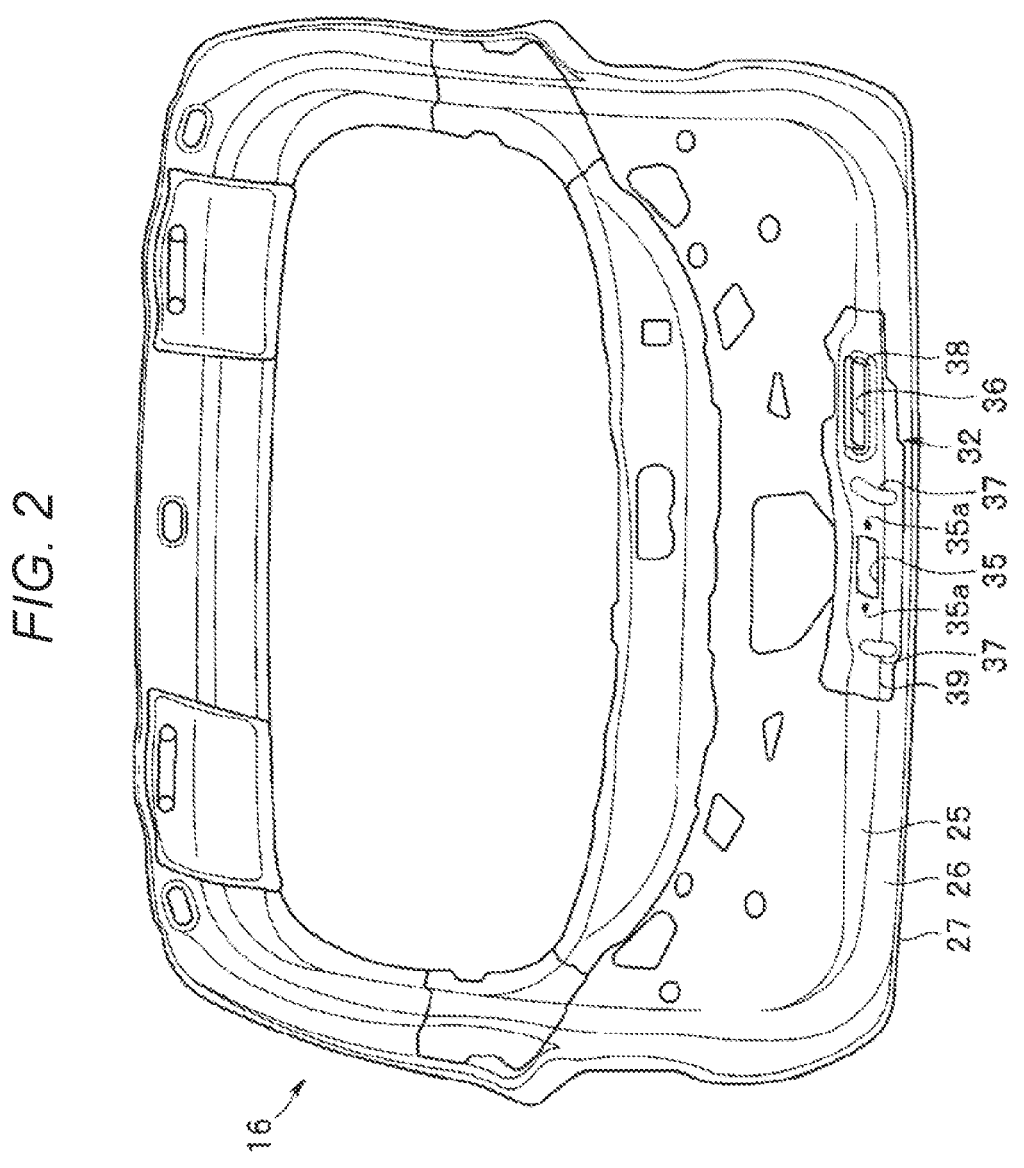
Figure 3:
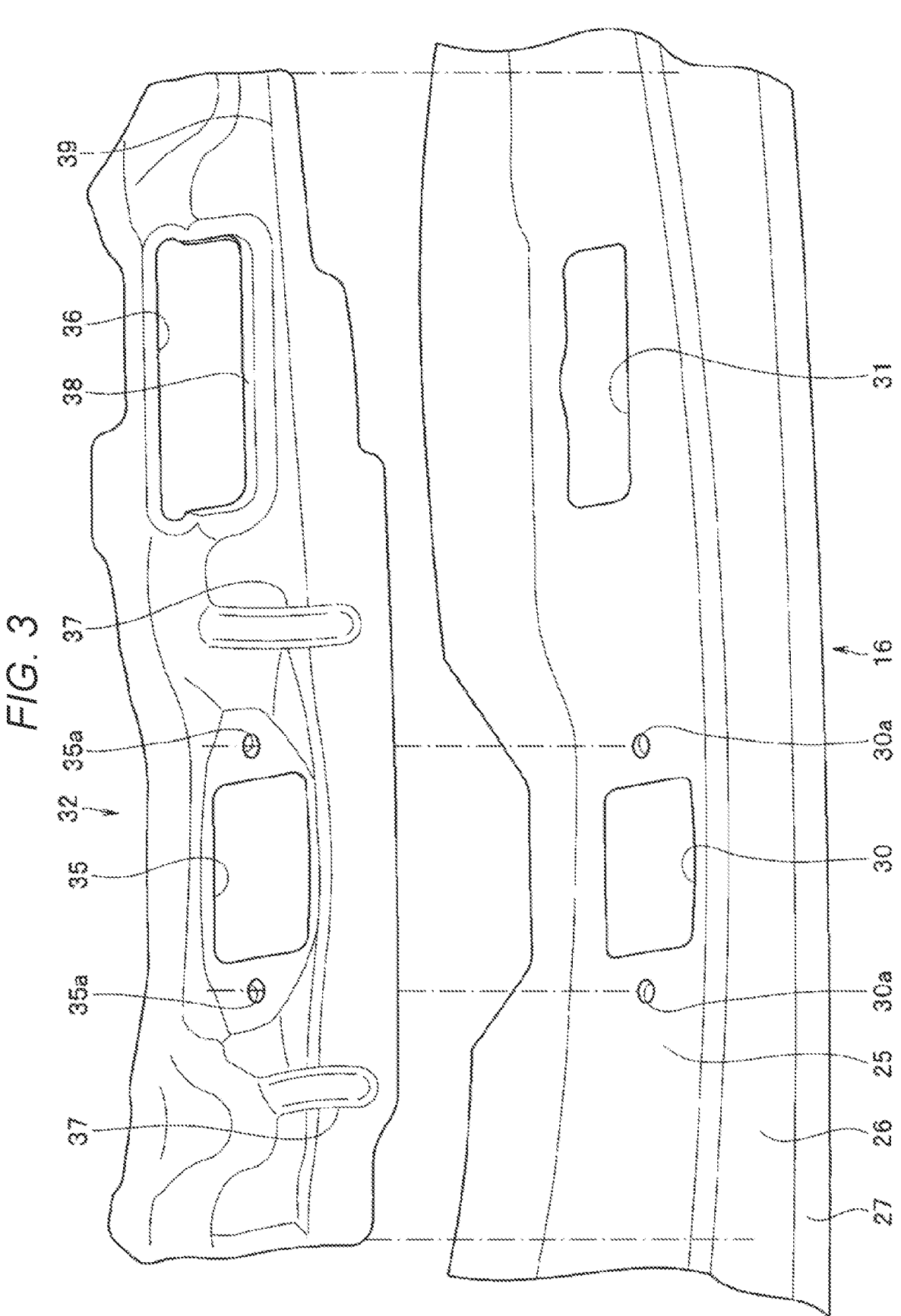
FIG. 3 is a plan view illustrating the inner panel and a bracket in an enlarged manner.

As illustrated in FIGS. 2 and 3, a bottom-forming member 25 and an inclined member 26 are provided on a lower end of the inner panel 16. The bottom-forming member 25 and the inclined member 26 are provided by bending the lower end of the inner panel 16 into a substantial crank shape. That is, the bottom-forming member 25 is provided by bending the lower end of the inner panel 16 rearward. The inclined member 26 is provided by bending a rear end of the bottom-forming member 25 obliquely downward. A flange 27 for hemming the inner panel 16 and the outer panel 15 together is provided on an edge of the inclined member 26.

The bottom-forming member 25 forms the bottom of the rear gate panel 10 when the inner panel 16 is joined to the outer panel 15.

Figure 4:
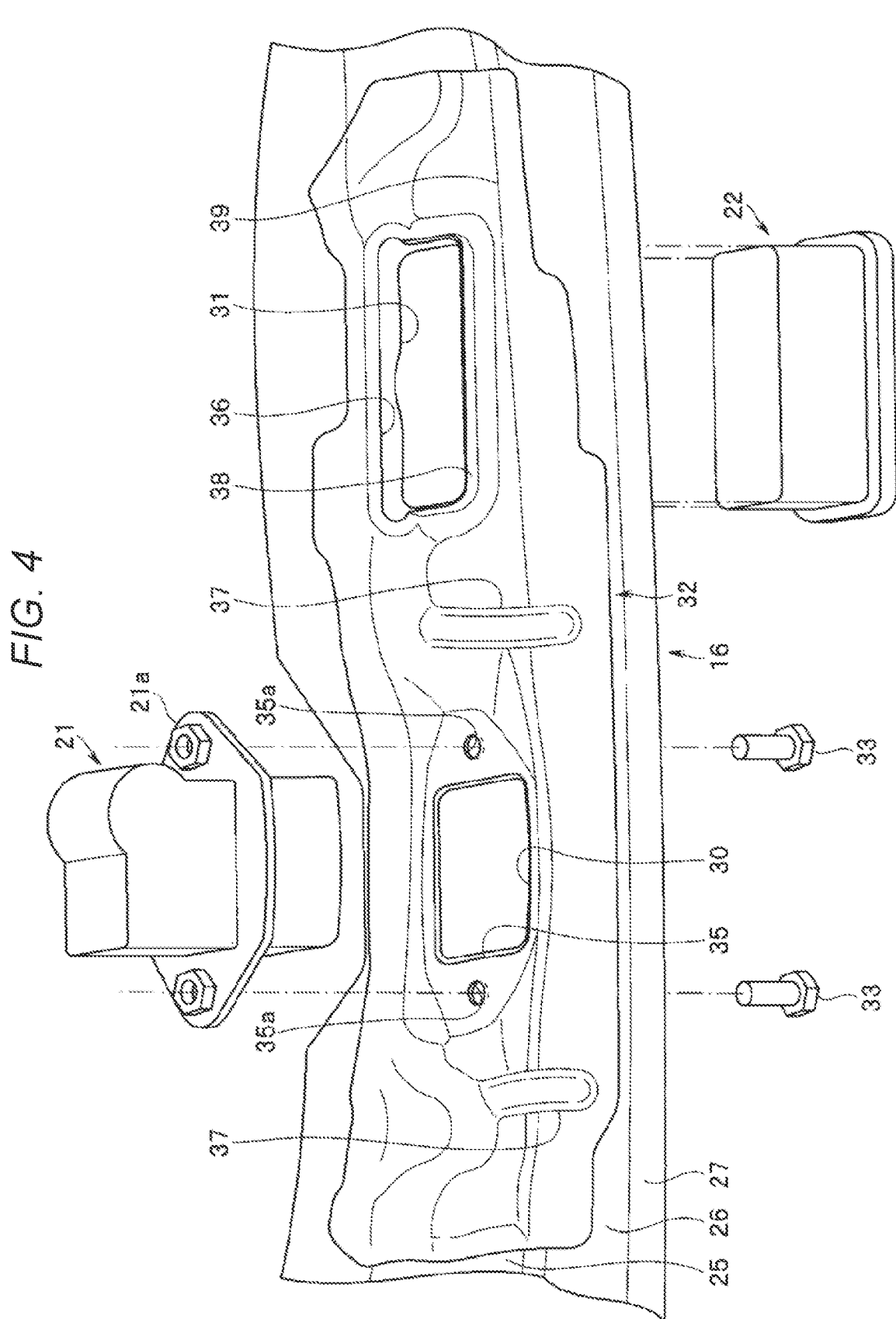
FIG. 4 is an exploded perspective view illustrating a ratchet mechanism and a pull handle attached to the inner panel.

As illustrated in FIGS. 3 and 4, a first ratchet opening 30 and a first handle opening 31 are provided in the bottom-forming member 25 of the inner panel 16. A bracket 32 is further attached to the inner panel 16.

The first ratchet opening 30 is provided in the bottom-forming member 25 at a substantial center position in the vehicle width direction. The first ratchet opening 30 is, for example, a rectangle hole through which the ratchet mechanism 21 can be inserted from an inner side of the rear gate panel 10. First bolt insertion holes 30a are provided on both sides of the first ratchet opening 30 in the vehicle width direction. For example, bolts 33 for fixing a flange 21a of the ratchet mechanism 21 to the inner panel 16 by fastening can be inserted through the first bolt insertion holes 30a.

The first handle opening 31 is provided in the bottom-forming member 25 at a position aligned with the first ratchet opening 30 in the vehicle width direction. The first handle opening 31 is, for example, a rectangle hole through which the pull handle 22 can be inserted from an outer side of the rear gate panel 10.

The bracket 32 is made of, for example, a sheet metal member having a substantially rectangular shape extending in the vehicle width direction. The bracket 32 is mainly attached to the bottom-forming member 25 by welding or the like. Accordingly, the bracket 32 integrally reinforces a region where the first ratchet opening 30 of the inner panel 16 is provided and a region where the first handle opening 31 of the inner panel 16 is provided.

A second ratchet opening 35 and a second handle opening 36 are provided in the bracket 32.

The second ratchet opening 35 is provided at a position corresponding to the first ratchet opening 30. The second ratchet opening 35 is, for example, a rectangle hole through which the ratchet mechanism 21 can be inserted. Second bolt insertion holes 35a are provided on both sides of the second ratchet opening 35 in the vehicle width direction. The bolts 33 inserted into the first bolt insertion holes 30a can be inserted through the second bolt insertion holes 35a.

The second handle opening 36 is provided at a position corresponding to the first handle opening 31. The second handle opening 36 is, for example, a rectangle hole through which the pull handle 22 can be inserted.

A pair of beads 37 are further provided on the bracket 32. The pair of beads 37 extend in a width direction (a thickness direction of the rear gate panel 10) of the bracket 32 on both sides of the second ratchet opening 35 in the vehicle width direction. These beads 37 mainly reinforce the second ratchet opening 35.

A flange 38 is further provided on the bracket 32. The flange 38 is provided on an edge of the second handle opening 36. For example, as illustrated in FIGS. 3 and 4, the flange 38 is provided as one piece from a rear edge to left and right edges of the second handle opening 36. This flange 38 mainly prevents an impact transmitted to the second handle opening 36 from being transmitted toward the second ratchet opening 35.

The bracket 32 further has a bent portion 39 that causes a part of the bracket 32 to incline obliquely downward following the inclined member 26 of the inner panel 16. A ridge provided on the bracket 32 by the bent portion 39 extends from one end to the other end of the bracket 32 in the vehicle width direction. The ridge provided by the bent portion 39 stiffens the whole bracket 32 by a ridge effect.

The ratchet mechanism 21 is fastened to the inner panel 16 provided with the bracket 32, using bolts 33, for example. That is, when the rear gate panel 10 is assembled, the ratchet mechanism 21 is sequentially inserted through the second ratchet opening 35 and the first ratchet opening 30. Then, the bolt 33 inserted into the first bolt insertion hole 30a and the second bolt insertion hole 35a is fastened to the flange 21a to fix the ratchet mechanism 21 to the inner panel 16.

The pull handle 22 is fixed to the inner panel 16 provided with the bracket 32 by adhesion, for example. That is, when the rear gate panel 10 is assembled, the pull handle 22 is sequentially inserted through the first handle opening 31 and the second handle opening 36. Then, the pull handle 22 is fixed to the inner panel 16 by adhesion or the like.

According to such an embodiment, the rear gate panel 10 includes the first ratchet opening 30 in the inner panel 16, the first handle opening 31 in the inner panel 16 at the position aligned with the first ratchet opening 30 in the vehicle width direction, and the bracket 32 that integrally reinforces the region where the first ratchet opening 30 and the first handle opening 31 are provided. The bracket 32 has the second ratchet opening 35 at the position corresponding to the first ratchet opening 30, the second handle opening 36 at the position corresponding to the first handle opening 31, and the beads 37 on both sides of the second ratchet opening 35 in the vehicle width direction. Accordingly, attachment portions for the ratchet mechanism 21 and the pull handle 22 can be efficiently reinforced with a simple configuration.

That is, the bracket 32 integrally reinforces the regions where the first ratchet opening 30 and the first handle opening 31 are provided. The bracket 32 further has the second ratchet opening 35 at the position corresponding to the first ratchet opening 30 and the second handle opening 36 at the position corresponding to the first handle opening 31. Accordingly, even when the pull handle 22 is provided in the vicinity of the ratchet mechanism 21 of the rear gate panel 10, the attachment portions for the ratchet mechanism 21 and the pull handle 22 can be reinforced without increasing the number of components. The bracket 32 further has the beads 37 on both sides of the second ratchet opening 35 in the vehicle width direction. Accordingly, strength of the second ratchet opening 35 can be reinforced without unnecessarily increasing a plate thickness of the bracket 32.

In this case, the bracket 32 further has the flange 38 on the edge of the second handle opening 36. Accordingly, the second handle opening 36 can be reinforced, and an impact transmitted to the second handle opening 36 can be prevented from being transmitted toward the second ratchet opening 35. Therefore, strength of the second ratchet opening 35 and the second handle opening 36 can be reinforced without unnecessarily increasing the plate thickness of the bracket 32.

The bracket 32 further has a bent portion 39 that forms the ridge extending from the one end to the other end in the vehicle width direction. The ridge effect of the ridge can stiffen the whole bracket 32. Therefore, strength of the second ratchet opening 35 and the second handle opening 36 can be reinforced without unnecessarily increasing the plate thickness of the bracket 32.

The disclosure in the above embodiment is not to be limited to the described modes and may be modified in various manners at an implementation stage without departing from the subject matter. Further, the above embodiment includes disclosures at various stages, and various disclosures can be extracted from appropriate combinations of multiple disclosed elements.

For example, even when some elements are removed from all the elements described in the above embodiment, a configuration from which these elements have been removed can be derived as a disclosure insofar as the stated circumstances can be addressed and the stated effects can be obtained.

The invention claimed is:

1. A vehicle rear gate panel comprising:
   a vehicle body panel that constitutes a rear gate panel;
   a first ratchet opening that is provided in the vehicle body panel and through which a ratchet mechanism is inserted;
   a first handle opening that is provided in the vehicle body panel at a position aligned with the first ratchet opening in a vehicle width direction and through which a pull handle is inserted; and a bracket integrally reinforcing a region where the first ratchet opening is provided and a region where the first handle opening is provided in the vehicle body panel, wherein
   the bracket comprises:
      a second ratchet opening that is provided at a position corresponding to the first ratchet opening and through which the ratchet mechanism is inserted,
      a second handle opening that is provided at a position corresponding to the first handle opening and through which the pull handle is inserted,
      beads that are provided on respective sides of the second ratchet opening in the vehicle width direction, and
      a flange on an edge of the second handle opening, the flange extending from a rear edge to left and right edges of the second handle opening.

2. The vehicle rear gate panel according to claim 1, wherein
   the bracket comprises a bent portion that forms a ridge extending from one end to another end in the vehicle width direction.

3. The vehicle rear gate panel according to claim 1, wherein
   the vehicle body panel is an inner panel that constitutes the rear gate panel.

4. The vehicle rear gate panel according to claim 1, wherein
   the vehicle body panel is an inner panel that constitutes the rear gate panel.

5. The vehicle rear gate panel according to claim 1, wherein the beads extend in a thickness direction of the rear gate panel.

6. The vehicle rear gate panel according to claim 1, wherein the bracket is made of sheet metal.

7. The vehicle rear gate panel according to claim 1, wherein the flange is a one-piece flange configured to prevent an impact transmitted to the second handle opening from being transmitted toward the second ratchet opening.

* * * * *